July 11, 1961 S. J. POPEIL 2,991,814
FOOD CUTTER
Filed Nov. 19, 1958 6 Sheets-Sheet 3

Inventor
Samuel J. Popeil
Attorney

United States Patent Office 2,991,814
Patented July 11, 1961

2,991,814
FOOD CUTTER
Samuel J. Popeil, 2920 Commonwealth Ave.,
Chicago, Ill.
Filed Nov. 19, 1958, Ser. No. 774,961
17 Claims. (Cl. 146—169)

The present invention relates to a food cutter, and more particularly to a multipurpose food cutter intended for household use which can be employed to shred or cut vegetables or other foods in slices of variable thickness, corrugated slices, shoestrings and perforated waffle-like slices.

Food cutters have been employed for years with a fixed blade for slicing of potatoes, carrots and other vegetables prior to or after cooking. With the advent of plain and fancier serving of more decorative and appetizing foods, canning and preservation of foods with the modern home deep freeze, and the increasing popularity of lazy susans, chip dips, and the like for fancy relishes and hors d'oeuvres the traditional fixed blade slicer requires several auxiliary pieces of equipment. In some instances, a corrugated slicer, and in others, parallel wires may be used.

All of the foregoing, taken either individually or together, suffer from the disadvantages of being separate, uncorrelated, and individual units. Most of the prior art units do not permit an infinite adjustment of thickness and those that do are not dependable in most cases. Many if not all of the prior art food cutters make no provision for safeguarding the user's hand or fingers from the cutting blade. None of the prior art slicers in which some attempt is made at adjusting the thickness of the slice, provide for proportioning the gap between the blade and the slicing table to the optimum in both the vertical and horizontal directions, particularly controlled by precision settings. Interchangeable or replaceable cutting blades have been crudely attached, or were non-existent. In addition, where table height adjustment has been a feature of the prior art food slicers, separate locking means have been required to secure the table at its various heights, or in most instances no such locking means is provided at all.

In view of the foregoing, it is the general object of the present invention to provide a food cutter with a dial-adjustable thickness of cut in which no further adjustment need be made by the user to lock in place or otherwise prepare for usage.

A related object of the invention is to furnish a variable table height food cutter and slicer in which the cutter blades snap in or snap out instantaneously. Blades are easily changeable for varying the type of cut, cleaning or sharpening dull blades.

A further object of the invention is to provide a variable slice thickness food cutter in which the table lip approaches the knife edge upon raising, and departs therefrom on lowering, through a simple dial adjustment thereby insuring optimum gapping between the food support and cutting edge.

Still another object of the invention is to provide a food cutter susceptible of cutting variable thickness slices in which the repositioning to specific slice thicknesses is accomplished by dialing to specified indicia on the device itself.

Yet another object of the invention is to provide a food cutter with a finger guard and pusher which does not bind on the table, and which pushes the last bit of food past the blade edge.

A more specific and related object is the provision of a food pusher finger guard in a food cutter which is removable for cleaning or for use not requiring the guard, and yet which is locked in place upon insertion of a snap in knife blade.

Still another object of the invention is to furnish a food cutter which, through simple and expeditious adjustment can shred or slice plain with varying thickness, corrugated with varying thickness, shoestring, and perforated waffle, all achieved by the quick interchange of one blade.

Further objects and advantages of the present invention will become apparent as the following description proceeds, taken in conjunction with the accompanying illustrative drawings, in which.

Figures 1, 2:
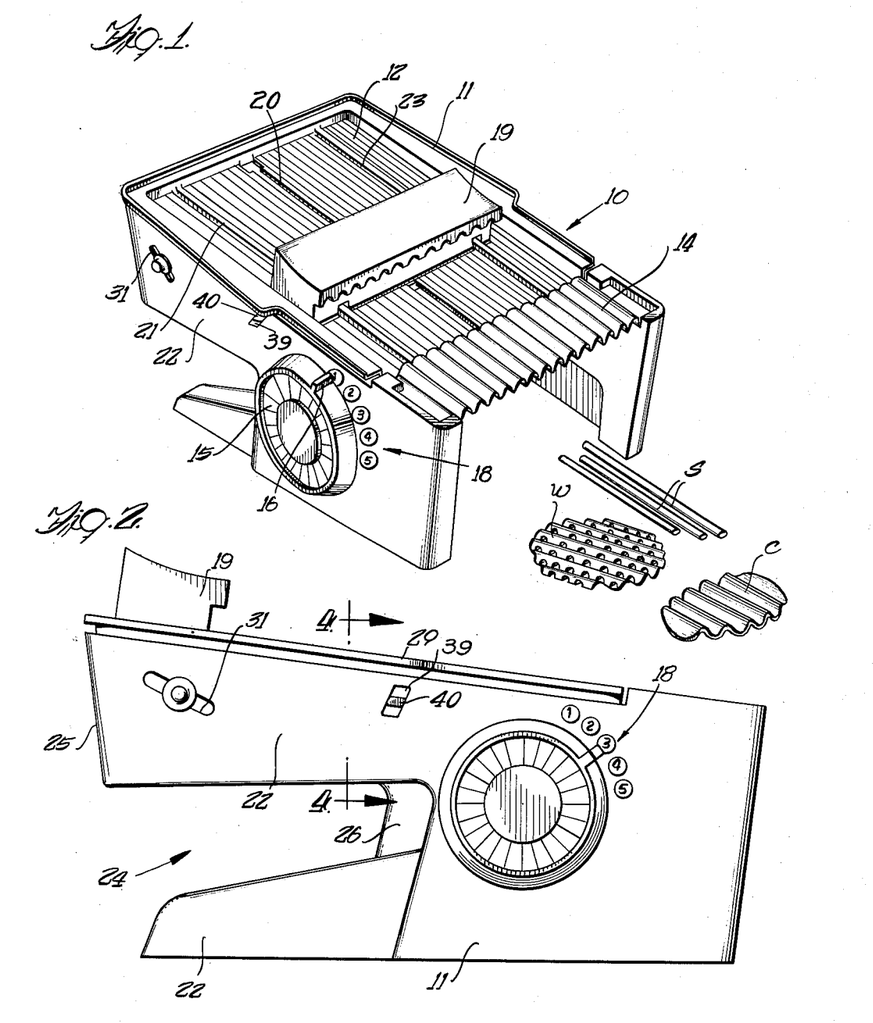
FIGURE 1 is a front perspective view of a food cutter illustrative of one embodiment of the present invention.
FIG. 2 is a side elevation of the food cutter shown in FIGURE 1.

The general organization and external configuration of a commercial embodiment illustrating the present invention is shown in FIG. 1. There it will be seen that the cutter 10 is made up principally of a frame or body 11 and an adjustable table 12 with a removable blade 14 fixed on the forward end of the cutter. A dial 15 mounted on a side of the frame 11 is rotated to provide a variable height adjustment of the table 12. In order to preset the dial to varying heights, an arrow 16 or other indicator on the dial is moved to correspond with various of the numerical slicing indicia 18 on the side of the frame 11. A combination pusher and finger guard 19 may be removably mounted on the top of the table with a key extending downwardly into the pusher slot 20 in the top of the table 12. A shoestring guide bar 21 extends along one side of the table 12 parallel with the pusher slot 20, and a ripple guide bar 23 extends along the other side of the table also parallel with the pusher slot 20.

In the description which follows, the organization of the cutter will be treated as first relating to the body and table adjustment, then as to the removable blades, and finally, more specifically as to the corrugated blade which is employed.

Referring now to FIG. 2, it will be seen that the body portion 11 includes a pair of side walls 22 with a recessed hand-hold area 24 at the rear portion of the body. An upper rear end piece 25 and a cross-brace 26 cooperate to form the body 11 in a generally rectangular configuration. It will be noticed that the table 12 angles downwardly at an angle approximately 10° with the horizontal, or the kitchen counter or working space on which a slicer would be used.

Figures 19, 20, 21:
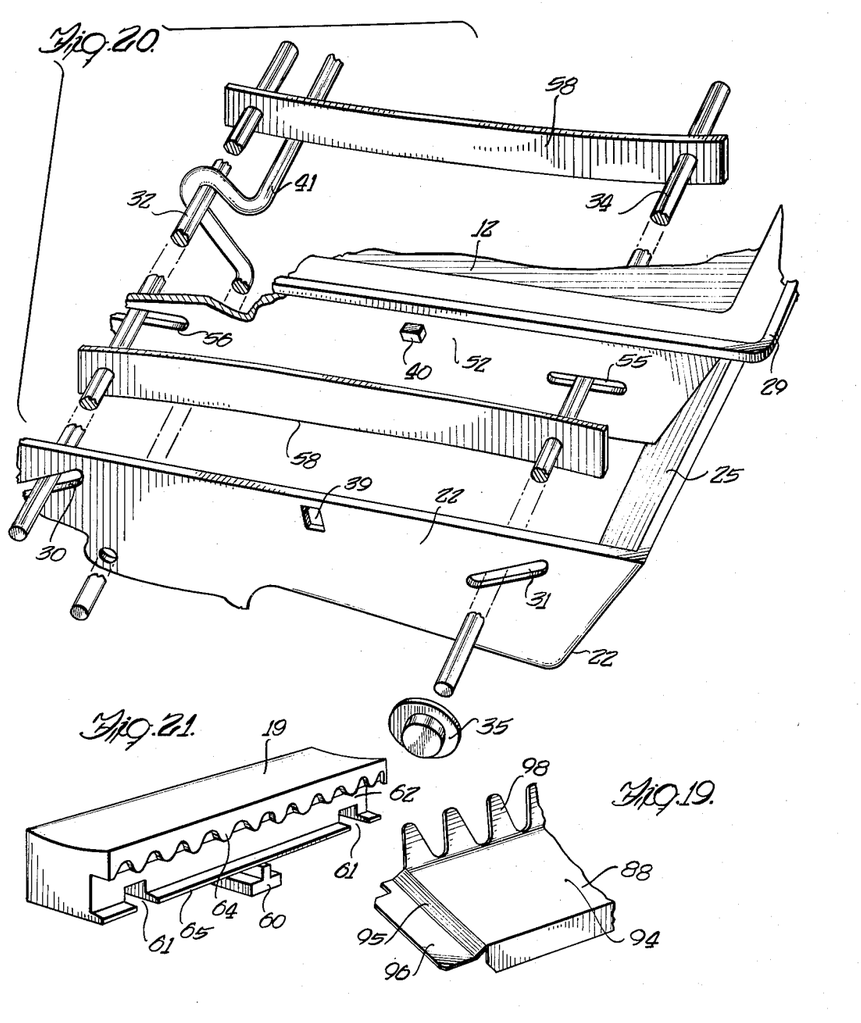
FIG. 19 is a partially broken perspective view of the brace-deflector illustrated in FIGS. 17 and 18.
FIG. 20 is a partially diagrammatic exploded, enlarged perspective view of the table height adjustment mechanism.
FIG. 21 is a perspective view of the combination pusher and finger guard.

The side walls 22 are provided with forwardly and downwardly angled front adjustment slots 30 see FIG. 20) and rear adjustment slots 31. These front and rear adjustment slots 31, 30 receive the front and rear raising rods 32 and 34 which are locked transversely by means of a slip-over securing cap 35. In order to guide the table 12 in its upward movement to achieve the optimum proportionate closure between the table top forward edge 36 and the blade cutting edge 38, a pair of guide slots 39 are provided in the side walls 22 of the body and are proportioned to receive the guide stops 40 which extend from the table 12. It will be seen that the guide slot 39 is angled slightly forwardly to provide the optimum closure relationship as outlined above.

Figures 4, 5:
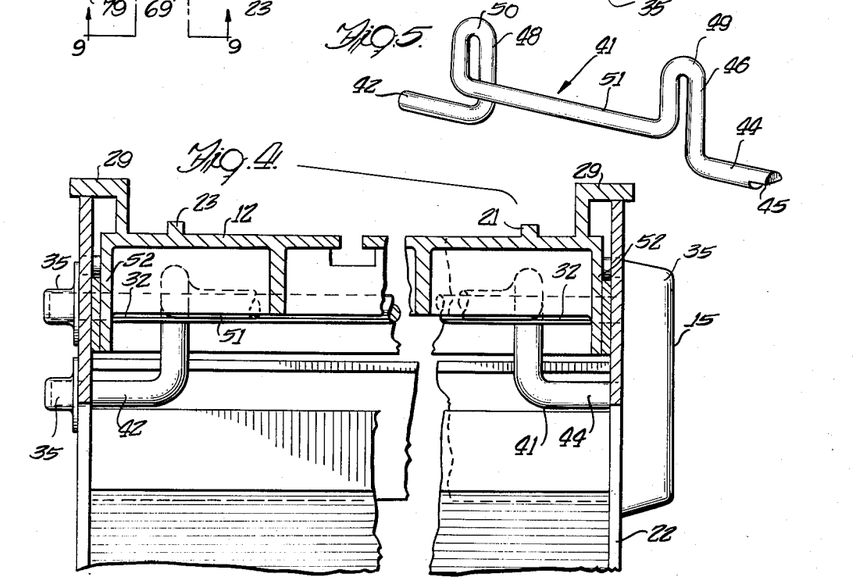
FIG. 4 is a transverse section, partially broken and enlarged, taken along section line 4—4 of FIG. 2.
FIG. 5 is a perspective view of the table height adjustment crank illustrated in other views of the accompanying drawings.

In order to control the height adjustment of the table 12, a crank 41 (see FIG. 5) is positioned transversely within the body 12. The crank 41 has two axle sections 42, 44, with one of the axle sections 44 bearing a flat 45 to which the dial 15 is attached. Upstanding crank arms 46, 48 extend at right angles to the axis of the axle sections 42, 44, and extend reversely looped end portions 49, 50 which are joined by means of the center section 51. In operation, the crank 41 extends laterally through the body 22 as shown in the section of FIG. 4. The reversely bent loops 49, 50 overlie the forward transverse rod 32 in such a manner that by rotating the dial 15, the rod 32 is urged forwardly or rearwardly.

Figure 6:
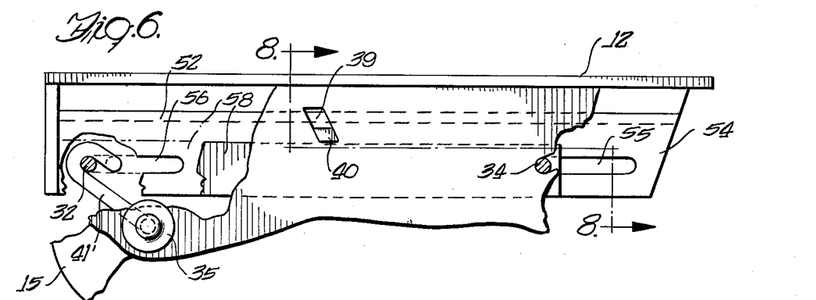
FIG. 6 is an enlarged, partially broken side elevation of the adjustable table and food cutter body showing the relationship between the table height adjustment crank and other elements of the adjustment mechanism.
Figure 7:
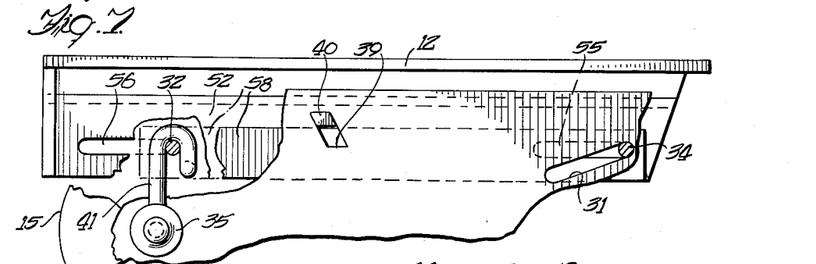
FIG. 7 is a sectional view showing the raising of the table but taken along the same elevation and with the same general sectioning and proportioning as FIG. 6.

Referring now to FIGS. 6 and 7, the action of the rods 32, 34 becomes more apparent. The downwardly depending edges 52 of the table 12 are provided with rod slots 55, 56 which are parallel with the table top. The rods 32, 34 extend through the parallel slots 55, 56 and also through the angled slots 30, 31 in the side walls of the cutter body. Therefore, as the crank 41 is rotated as shown sequentially between FIGS. 6 and 7, the rods 32, 34 move rearwardly and upwardly in the angled side wall slots, thereby forcing the table 12 to move upwardly. At the same time, the stop 40 in the guide slot 39 locks the table against rearward motion, and actually constrains it to move forwardly slightly as it moves upwardly.

In order to insure a parallelism of operation between the fore and aft rods 32, 34, a pair of tie bars 58 are provided with holes on the rod centers so that a parallelism of motion is insured as between the two rods see FIG. 20). The tie bar 58 is bowed slightly along its longitudinal axis to insure a centering of the table side walls 52, with relation to the body side wall 22, and also to provide a frictional assist in retaining the table in place at its preselected situation.

In order to insure a frictional relationship between the rods 32, 34 and their respective slots so that the table 12 will remain fixed in whatever position is dialed, the angles selected for the intersection between the inclined slots 30, 31 and the parallel slots 55, 56 must be greater than the frictional angle for the body and table material as related to the point frictional contact with the tie rods 32, 34, plus the same relationship between the stop 40 and the guide slot 39. In a commercial embodiment which has operated successfully with a minimum of friction and yet a satisfactory frictional locked relationship, the included angle between the angled slots 30, 31 and the parallel slots 55, 56 in the table was selected as 26°. The included angle between the guide slot 39 and a perpendicular to the table 12 was selected as 18°.

With the construction as described, it becomes apparent that downward pressure on the table 12 pushes the rods 32 and 34 downwardly and consequently sets up a tendency for these rods to slide in the sloping slots 30 and 31. As the table 12 is restricted to an essentially upward or downward motion (nearly perpendicular to the slots 30 and 31) by the engagement of the stops with the slots 39 in the frame, sliding in the slots 30 and 32 is possible only if the rods also slide in the slots 55 and 56 of table 12. Thus, friction counteracting such sliding impinges on said rods in two separate locations, in effect more than doubling the frictional resistance that would be present if the rods would slide in slots 55 and 56 only. Therefore, the table slides by application of force to the rods (through crank 41) and not by application of force to the table directly. Similarly, forward forces acting on the table (for instance when a chunk of foodstuff is moved along the table) does not cause the latter to move because such forces impinge almost perpendicularly on the walls of the slots 39. Moreover, the slots 39 are oriented so that whatever wedging action tends to take place here is constrained to lift the table rather than lower it. Therefore, simultaneous downward and forward pressures on the table partly cancel each other.

By employing the transverse rods, tie bar, and angled slots plus guide slot and stop, the majority of the working elements can be molded into the plastic material which is used to form the body and table of the cutter. The rods 32, 34 may be economically fashioned from ordinary wire stock, as well as the crank 41 and admit of a wide variation in tolerance. By longitudinally bowing the tie bar 58, a slightly yieldable snug fit is effected between the table 12 and the body 22, while at the same time insuring a snug frictional contact between all of the rods and their respective slots.

Figure 8:
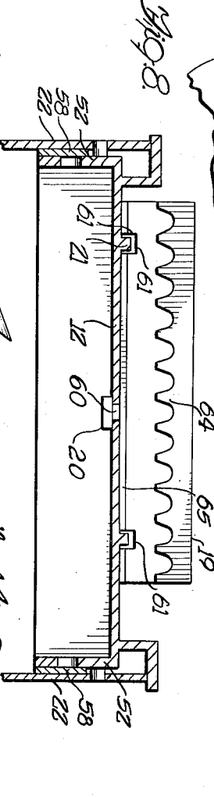
FIG. 8 is a transverse section taken along section line 8—8 of FIG. 6.

The pusher 19, as shown in FIGS. 8 and 21, is provided with a T-shaped lock 60 extending from its lower portion which interlockingly engages the table 12 and is guided thereon by means of the slot 20 in the table 12. Recesses 61 are provided in the bottom of the pusher 19 in order to accommodate the shoestring guide bar 21 and ripple guide bar 23. A recessed blade-receiving forward portion 62 is flanked by a scalloped upper portion 64 and a lower blade ledge 65 which effectively overlap the cutting edge 38 of whatever blade is employed so that any food being cut is completely engaged with the blade cutting edge. It will be appreciated that the finger guard and pusher 19 can be removed for cleaning at any time the blade 14 is removed, and yet the pusher 19 is locked in place at any time the blade 14 is secured in position at the forward portion of the slicer 10.

Figure 3:
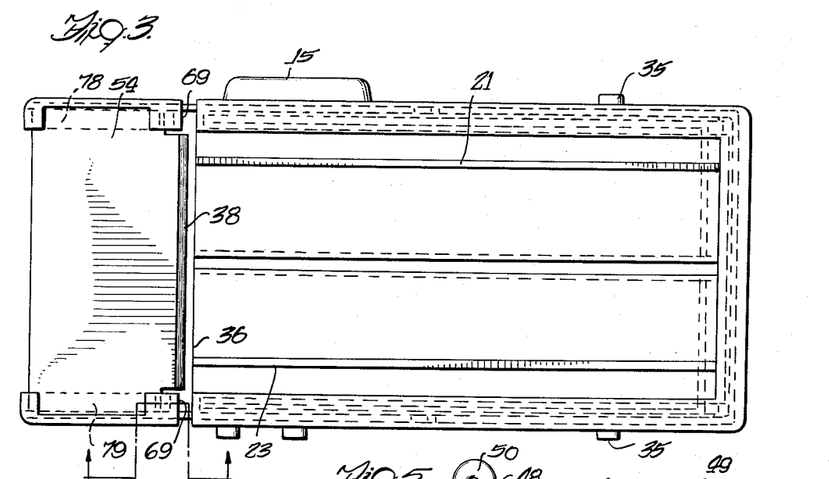
FIG. 3 is a top view of the food cutter shown in FIG. 2.
Figure 9:
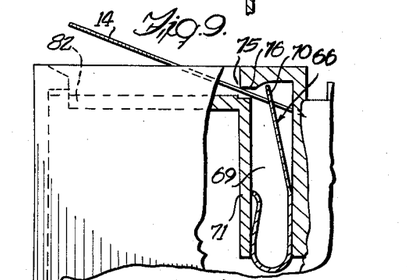
FIG. 9 is an enlarged, partially broken, partially sectioned view taken along section 9—9 of FIG. 3 and showing of the blade insert and retaining mechanism at the forward portion of the cutter showing a plain blade in the course of insertion.
Figure 10:
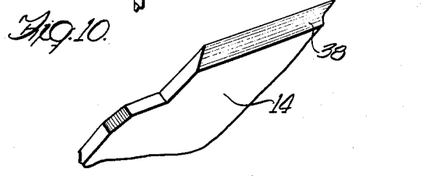
FIG. 10 is a perspective view of the plain cutting blade which is being inserted in FIG. 9.
Figure 11:
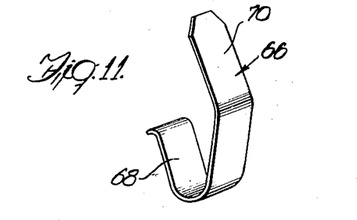
FIG. 11 is a perspective of the blade-retaining spring shown in cross section in FIG. 9.

The blade is held in place by means of a pair of blade lock springs 66 which have a generally J-shaped configuration. The lower loop portion 68 rests within a pocket 69 (see FIGS. 9, 11, 12 and 13) with the upper leg 70 extending forwardly and in yieldable engagement with the blade 14. Referring momentarily to FIG. 3, it will be seen that the blade lock spring pocket 69 is formed at the forward portion of the frame assembly 11 at each side of the table 12. A forward rib 71 (see FIGS. 9, 12, 13) is molded into the body 11, parallel to the rear wall portion 72 which together with the side wall sections make up the blade spring pocket construction. A stop 74 prevents the lock spring 66 from dropping out of the pocket 69.

Figures 12, 13, 14, 15, 16, 17, 18:
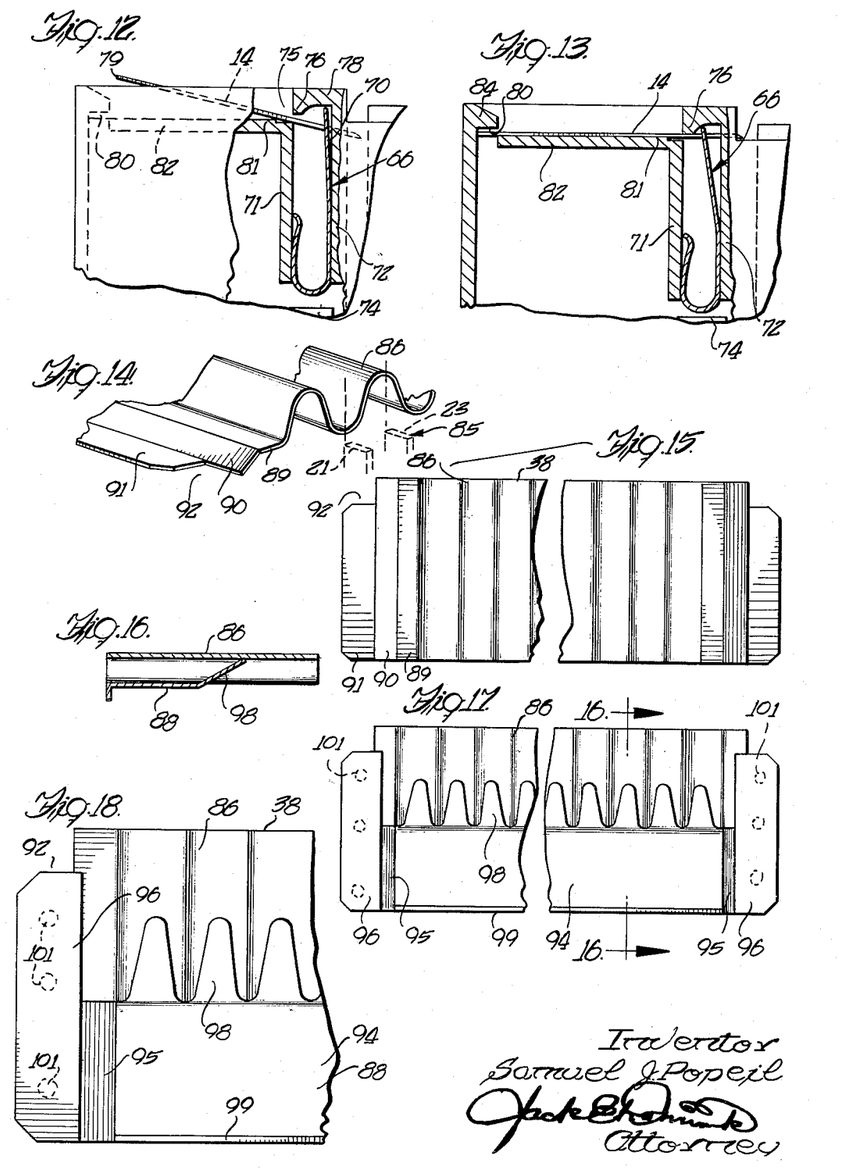
FIG. 12 is a view taken along the same line as FIG. 9, but showing the blade as it is pushed forward prior to lowering and final resting.
FIG. 13 is a view similar to FIG. 12, showing the blade after it has been brought to rest on its support and pushed home by the retaining spring and thereby locked in place.
FIG. 14 is an enlarged perspective, partially broken view of the corrugated blade.
FIG. 15 is a top view of the corrugated blade.
FIG. 16 is an end view of the corrugated blade illustrating the relationship between the brace-deflector and the corrugated blade.
FIG. 17 is a top view partially broken, of the brace-deflector which is subsequently attached to the corrugated blade to complete the blade assembly.
FIG. 18 is an enlarged top view of the assembled blade and brace-deflector.

In operation, the blade is angled downwardly at its rear portion and inserted through the blade opening 75 (see FIG. 9) until the shoulder of the blade begins to press back on the upper leg 70 of the lock spring 66. A blade opening projection 76 extends downwardly from the blade pocket overhanging lip 78 in order to narrow the opening 75 and to subsequently serve as an abutment for the blade 14. As will be seen in FIG. 12, when the upper leg 70 of the blade lock spring 66 is shoved rearwardly, the forward edge of the blade can be lowered and then by the action of the lock spring 66 moved forwardly into the forward blade pocket 80. When the blade comes to rest, as shown in FIG. 13, the slight rearwardly, upwardly pitched inclined shim 81 on the blade support shoulder 82 forces the forward edge of the blade upwardly into proximate contact with the blade opening projection 76. The forward blade pocket overhanging rim 84 cooperating with the blade opening projection 76 on the rim 81 secures the blade horizontally, while the force of the blade lock spring 66 secures it longitudinally and, of course, the side walls of the body secure the blade laterally. To remove the blade, the user engages the rear edge of the blade which is unsharpened and pushes it forwardly and then upwardly until the rear edge is disengaged from the forward blade pocket 80, and the blade is then removed from the cutter. The blade removal is necessitated for cleaning, sharpening, and replacement to use a corrugated blade instead of a straight edge blade for obtaining a wide variety of food cuts.

In order to achieve the corrugated cuts C, shoestring cuts S, and the desirable perforated waffle cut W (see FIG. 1), a corrugated blade is used. It has been found that if the corrugated blade is thicker than approximately .012 of an inch, the blade begins mashing the food rather than cutting. However, in order to employ a .012 thickness corrugated blade across the span required for the blade, its strength must be substantially increased. Dimensional stability of the corrugated blade is essential for the making of shoestring, ripple and perforated waffle cuts. To insure such dimensional stability a backing member is constructed for cooperative action with the corrugated portion of the blade. Referring now to FIGS. 14 to 19, the corrugated blade assembly 85 is made up of the corrugated blade portion 86 and the back support blade 88. The corrugated blade portion 86 follows a generally sinuous configuration, terminating in end flats 89 which are joined by an angled portion 90 with the end locking tabs 91. A recess 92 at the forward portion of the end locking tabs 91 is provided so that the cutting edge 38 of the blade will extend forwardly into a proximate relationship with the forward edge 36 of the cutting table 12.

The blade support member 88 is provided with a body 94, angled connectors 95 and locking tab segments 96. At the forward portion of the back support 88, a plurality of scalloped deflector fingers 98 are provided which engage the undersurface of the corrugated blade 86 and serve to support the same as well as deflect the passage of food across the blades. The deflector fingers 98 are angled with the plane of the blade and table at an angle approximating 40°. A single rear support rib 99 is provided at the rear edge of the back 88, and extends perpendicularly downward therefrom. The back 88 is then welded to the blade along the weldments 101 shown in FIG. 18 which are placed at preselected points of overlapping between the end tabs 91, 96 and also along the ones of the point contact interceptions between the curves of the corrugations and the back 88.

By employing the foregoing construction for the corrugated blade, the advantage of a thin section for the cutting member is preserved and the disadvantage of dimensional and lateral instability removed by means of the backing member 88. In addition, the backing member 88 adds strength to the corrugated portion as well as served to strip the cutting edge of its food by means of the angled deflector fingers 98. The straight blade 54, such as illustrated in FIG. 3, has end tab portions formed to the same proportions as on the corrugated blade.

In order to cut a wide variety of patterns with the subject cutter, the corrugated blade 14 and the straight blade 54 are used interchangeably. It is with the corrugated blade 14 that the fullest advantages of the cutter are achieved. The cutting of a potato will serve to illustrate its utility. The potato is first peeled and then placed on the table 12 with the dial 15 turned to a preselected number for thickness. The potato is then pushed by the finger guard 19 along the table top until the slices begin coming out beneath the corrugated blade 14. Then to cut the perforated, waffled potato, the potato is rotated 90° each time it is sliced by the corrugated blade 14. To cut shoestring potatoes, the potato is similarly prepared, but care is taken so that at all times the julienne guide bar 21 is engaged in one of the recessed portions of the potato body. To cut corrugated or rippled potatoes, the same technique is used as with the julienne or shoestring potatoes, except that the rippled bar 23 is engaged. The julienne bar 21 is oriented for positioning directly beneath one of the lower portions of the sinuous or corrugated blade 14, whereas the rippled or corrugated cutter guide bar 23 is located on a center with one of the high or upper portions of the corrugated blade, in the manner illustrated diagrammatically in dotted lines on FIG. 14. Failure to properly align the guide bars 21, 23 on the centers indicated will result in imperfect cutting.

Figure 22:
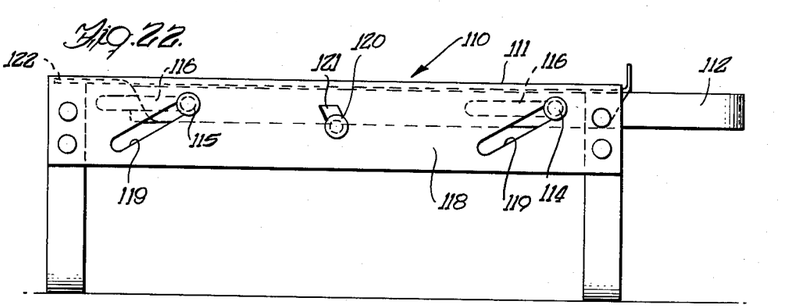
FIG. 22 is a side elevation of an alternative embodiment table height adjustment mechanism and slicer.
Figure 23:
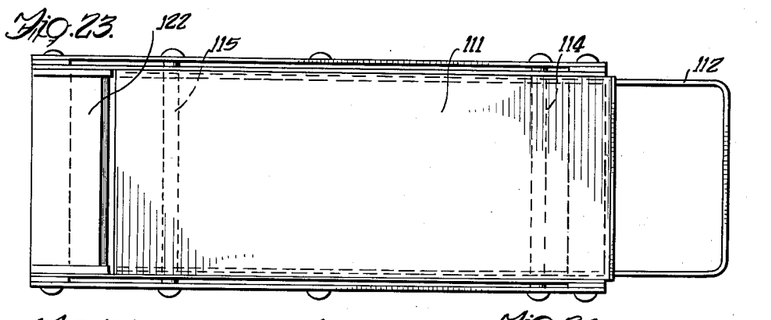
FIG. 23 is a top view of the cutter shown in FIG. 22.

While the foregoing embodiment described is the preferred and commercial embodiment for the subject food cutter, it will be appreciated that other constructions can be employed which do not depart from the spirit or general teaching as set forth. For example, referring to FIGS. 22 and 23, it will be seen that a cutter 110 has been constructed, and in this instance of sheet metal, in which the table 111 is raised or lowered by means of the rearwardly extending handle or yoke 112. Transverse rods 114, 115 extend through slots 116 in the table skirt parallel with the table top, and thereafter through the frame skirt 118 in the angled slots 119. A stop 120 and guide slot 121 are provided along the side wall 118 of the frame. As the yoke is pushed forwardly by the handle 112, the rods 114, 115 move downwardly along the angled slots 119 and carry the table downwardly by engaging the horizontal slots 116. The guide pin 120 abuts the forward wall of the guide slot 121 and moves the table slightly rearwardly from the blade 122.

Two alternatives for attaching the blade to the alternative embodiment cutter described and shown in FIGS.

Figures 24, 25, 26, 27, 28:
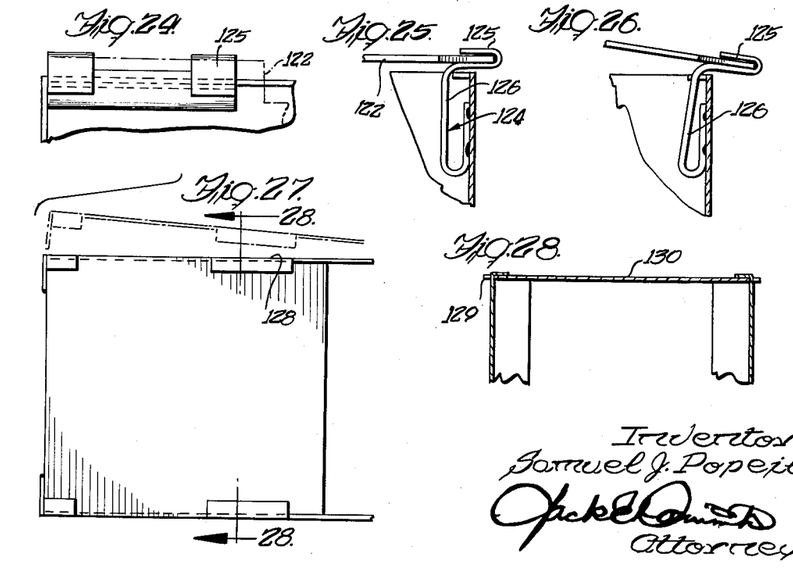
FIG. 24 is a front elevation, enlarged and partially broken, showing an alternative embodiment blade attachment mechanism.
FIG. 25 is a partially sectioned, partially broken, enlarged view illustrating how the blade is inserted into the alternative embodiment blade attachment illustrated in FIG. 24.
FIG. 26 is a further illustration like FIG. 25, showing the resilient yielding action of the blade support.
FIG. 27 is a top view of still another embodiment of a blade attachment mechanism.
FIG. 28 is a transverse section showing the alternative embodiment blade attachment of FIG. 27, taken along section line 28—28 of FIG. 27.

22 and 23 above, are shown in FIGS. 24 through 28. Referring first to FIG. 25, it will be seen that the blade 122 is engaged by means of a reversely bent locking spring 124 which has an upper pocket 125 and a long body portion 126 which is yieldable. To insert the blade, the user extends one end thereof into the reversely bent pocket 125, as shown in FIG. 26, flexes the long support member 126, and then lowers the other end of the blade and slips it into a smaller pocket on the other side of the slicer.

In the embodiment shown in FIGS. 27 and 28, the side walls 128 of the cutter may be deflected outwardly as shown in the phantom lines, and the blade slipped into position whereafter the side walls are released and yieldably reengage the blade. FIG. 28 shows the forward portion of the blade member shown in FIG. 27, illustrating how the locking is achieved by having extended portions of the blade 130 protrude through slots (not shown) in the side wall of the slicer.

In review, it will be seen that a cutter has been shown and described in detail which permits the interchangeability of blades for cleaning and the accomplishing of a wide variety of kitchen cutting, shredding and slicing tasks, all on one mechanism. The cutter, in addition has an adjustable table which can be dialed simply to a preselected height, and the table will remain at that height irrespective of the pressures exerted upon it in use. The food pusher and safety member may be selectively placed upon the table, and locked therein by the insertion of the blade, and yet susceptible of removal for cleaning or for non-use at any time so desired.

While in the foregoing specification embodiments of the invention have been set forth in considerable detail for purposes of making an adequate disclosure thereof, it will be apparent that numerous changes may be made in those details without departing from the spirit and scope of the invention, as expressed in the following claims.

I claim:

1. In a food cutter having a shiftable table and a frame, said table and said frame having parallel side wall portions, a table height adjustment mechanism comprising, in combination, a crank journaled on said frame side walls and perpendicular therewith, said crank having dial actuating means along a frame side wall, a transverse rod slidably engageable with said crank, means defining a pair of coacting slots in said table side wall and said frame side wall to receive said transverse rod, the axes of said slots defining a mutually included acute angle, interconnecting guide means between said table and said frame, the whole in such combination that upon rotating the crank rod dial the transverse rod is moved fore and aft and coacts with the table and frame side wall slots to raise or lower the table, the interconnecting guide means coacting to guide the table along a preselected path when raised or lowered through the crank actuating means.

2. In a food cutter having a shiftable table and a frame, said table and said framing having parallel side wall portions, a table height adjustment mechanism comprising, in combination, a crank, said crank having actuating means external of said frame, a transverse rod engageable with said crank, means defining coacting slots in said table side wall and said frame side wall to receive said transverse rod, the axes of said slots defining a mutually included acute angle, a projection on one of said side walls, means defining a projection receiving recess on the other of said side walls, the whole in combination that upon rotating the crank rod the transverse rod is moved fore and aft and coacts with the coacting slots to raise or lower the table, the projection and projection receiving recess coacting to guide the table when raised.

3. In a food cutter having a shiftable table and a frame, said table and said frame having parallel side wall portions, a table height adjustment mechanism comprising, in combination, a crank, said crank having actuating means external of said frame, a transverse rod in engagement with said crank, means defining coacting slots in said table side wall and said frame side wall to receive said rod, one of said slots being parallel to said table and one of said coacting slots being angled with said table, a projection on one of said side walls, means defining a projection receiving recess on the other of said side walls, the whole in such combination that upon rotating the crank rod the transverse rod is moved fore and aft and coacts with the inclined slot to raise or lower the table, the projection and projection slot coacting to move the table forwardly when raised.

4. A food cutting machine comprising, in combination, a frame, table, fore and aft transverse pins, means defining elongate slots in the cutting table to receive the pins, means defining coacting slots in the frame side walls to slideably receive said pins, a tie bar for interposition between the frame side walls and the slicing table, means defining openings in said tie bar to receive the transverse pins, a crank engageable with one of said transverse pins for shifting said pin fore and aft, a projection extending from one of said side walls, and means defining a mating guide recess in the other side wall to guide the table during up and down movement.

5. A food cutting machine comprising, in combination, a frame, a table, said table having depending side walls parallel with the frame, fore and aft transverse pins, means defining alongate slots in the table side walls to receive the pins, means defining slots in the frame side walls defining an acute angle with the table side wall slots to slideably receive said pins, tie bars for interposition between the frame side walls and the slicing table side walls, means defining openings in said tie bars to receive the pins, a crank engageable with one of said transverse pins for shifting said pin fore and aft, a guide projection extending from one of said side walls, and means defining a mating guide slot in the other of said side walls angled to constrain the table during up and down movement to shift the table forward when moved upwardly and to shift the table rearwardly when moved downwardly.

6. A food cutting machine comprising, in combination, a frame, said frame having parallel side walls, a slicing table, said table having downwardly depending side walls parallel with the frame side walls, fore and aft transverse pins, elongate slots in the slicing table side walls to receive the pins, angled slots in the frame side walls to slideably receive said pins, a pair of tie bars for interposition between the frame side walls and the slicing table, means defining openings in said tie bars to receive the pins, said tie bars being longitudinally bowed whereby they yieldably center the table between the frame side walls, a crank engageable with one of said transverse pins for shifting said pin fore and aft, dial means for rotating said crank to preselected positions, a guide projection extending from one of the side walls, and means defining a mating guide slot in the adjacent parallel side wall angled to constrain the table during up and down movement to shift the table forward when moved upwardly and to shift the table rearwardly when moved downwardly.

7. A removable blade for insertion in a food cutter, said blade being characterized by a corrugated cutting element not exceeding .020" thickness, one edge of said cutting member being sharpened to present a corrugated cutting edge, fastening tabs extending from the blade ends; and a support-deflector, said support-deflector having a body portion extending along the blade length, a rib along the rear of said body portion, a plurality of scalloped deflector fingers extending forwardly from the body of the support-deflector and proportioned to matingly engage the corrugated blade, said deflector fingers intersecting the blade at an angle of 40° or less.

8. A removable blade for insertion in a food cutter, said blade being characterized by a corrugated cutting element, one edge of said cutting member being sharpened to present a corrugated cutting edge, fastening tabs extending from the blade ends; and a support-deflector, said support-deflector having a body portion extending along the blade length, a rib along said body portion, a plurality of scalloped deflector fingers extending forwardly from the body of the support-deflector and proportioned to matingly engage the corrugated blade, said deflector fingers intersecting the blade at a mid-portion thereof leaving an uninterrupted corrugated forward cutting edge with deflector fingers to peel the slices off the blade.

9. In a food slicer having a frame and a table portion, a replaceable blade for insertion within said frame forward of said table portion, said blade being characterized by a corrugated cutting element not exceeding .020" thickness, one edge of said cutting member being sharpened to present a corrugated cutting edge, fastening tabs extending from the blade ends; and a support-deflector, said support-deflector having a body portion extending along the blade length, a rib along the rear edge of said body portion, a plurality of scalloped deflector fingers extending forwardly from the body of the support-deflector and proportioned to matingly engage the corrugated blade, said deflector fingers intersecting the blade at 40° or less, and at a mid-portion thereof to define an uninterrupted forward cutting portion leading into a deflector portion to peel slices from the blade.

10. In a food cutter having a table, a frame, the table resting within the frame, and blade for removable insertion in the frame forward of the table, said blade having mounting tabs at each end; a blade attachment mechanism comprising, in combination, a pair of opposed shoulders facing upwardly and spaced for the blade tabs to rest atop said shoulders, a pocket in the frame at one end of and beneath said shoulder, a yieldable means insertable in said pocket, an overhanging ledge above said pocket, a second pocket extending longitudinally from the opposite end of said shoulder, the whole in such combination that the blade is inserted by its end tabs into the pocket beneath the ledge and against the yieldable means and thereafter is lowered and the opposite end of the mounting tab fits within the horizontal pocket, the shoulder and ledge serving with the horizontal pocket to lock the blade against vertical displacement.

11. In a food cutter having a table, a frame, the table resting within the frame, and blade for removable insertion in the frame forward of the table, said blade having mounting tabs at each end; a blade attachment mechanism comprising, in combination, a pair of opposed shoulders facing upwardly and spaced for the blade tabs to rest atop said shoulders, means defining a pocket in the frame at one end of and beneath said shoulder, a J-shaped spring insertable in said pocket, an overhanging ledge above said pocket, a downwardly depending abutment from said ledge, a second pocket extending longitudinally from the opposite end of said shoulder, an inclined shim portion on said shoulder angling upwardly toward said overhanging ledge but terminating beneath the downwardly depending abutment, the whole in such combination that the blade is inserted by its end tabs into the pocket beneath the ledge and against the upper leg of the J-shaped spring and thereafter is lowered and the opposite end of the mounting tab fits within the horizontal pocket, the shoulder shim and ledge depending abutment serving with the horizontal pocket to lock the blade against vertical displacement.

12. In a food cutter having a slicing table and a corrugated blade, the table height being adjustable relative to the blade to provide for varying thickness of cut, a safety finger guard pusher assembly comprising, a transverse pusher, connecting means on said pusher along the lower portion thereof, pusher mating connecting means on said table, and a scalloped leading edge on said pusher proportioned for overlapping coaction with said corrugated blade whereby foodstuffs being cut are urged beyond the edge of the blade to insure complete engagement therewith.

13. For use in a food cutter, a corrugated blade for cutting ripple, lattice, and shoestring slices, said blade comprising, in combination, a corrugated body portion, a cutting edge along the forward portion of said corrugated body portion, mounting tabs at each end of said blade, said mounting tabs lying in a plane parallel with and beneath a plane tangential with the tops of the corrugations thereof, a support along the length of said convoluted body, said support being secured to preselected corrugations in tangential relation thereto, said support having end portions secured to said mounting tabs, the rear edge of said support being substantially flush with the rear edge of said convoluted blade, and a rib extending downwardly from said support at the rear edge thereof and substantially flush with the edge of the convoluted body.

14. For use in a food cutter, a corrugated blade for cutting ripple, lattice, and shoestring slices, said blade comprising, in combination, a corrugated body portion, a cutting edge along the forward portion of said corrugated body portion, mounting tabs extending laterally from each end of the corrugated body portion, said mounting tabs lying in a plane parallel with and beneath a plane tangential with the tops of the corrugations thereof, a support along the length of said body, said support being secured to preselected corrugations in tangential relation thereto as by welding, said support having end portions secured to the said mounting tabs, the rear edge of said support being substantially flush with the rear edge of said convoluted blade, and a rib extending downwardly from said support serving the twofold purpose of a support and deflector of cut foodstuffs to direct the same downwardly.

15. A food cutter comprising, in combination, a frame, a table mounted on said frame, said table having a forwardly located straight edge, means interconnecting the table and frame for adjusting the height of said table with relation to said frame, a corrugated blade, means removably securing the corrugated blade on the frame in front of the table straight edge, elongate guide bars on the table oriented with their axes perpendicular to the table forwardly located straight edge, one such guide bar aligned with a low point on the sinuous curve of the corrugated blade, and one such guide bar aligned with a high point on the sinuous curve of the corrugated blade, means defining a track in the middle of the table parallel with the two guide bars, a pusher, interlock means at the lower portion of the pusher and engaging the table track means, and means defining guide bar recesses in the bottom of the pusher whereby the pusher may remain engaged for cutting by either guide bar at varying thicknesses of cuts.

16. A food cutter comprising, in combination, a frame having parallel opposed side walls, a table mounted on said frame, said table having parallel depending side walls and a transverse straight forward edge, means interconnecting the table and frame for adjusting the height of said table with relation to said frame, guide means constraining the table to advance toward the blade when raised, a corrugated blade, means removably securing the corrugated blade on the frame in front of the table forward edge, elongate guide bars on the table, one such guide bar axially aligned with a low point on the corrugated blade, and one such guide bar axially aligned with a high point on the corrugated blade, table interlock means in the middle of the table parallel with the two guide bars, a pusher, pusher interlock means at the lower portion of the pusher proportioned for sliding engagement relation with the table interlock means, and means defining guide bar recesses in the bottom of the pusher whereby the pusher may remain engaged for cutting by either guide bar at varying thicknesses of cuts.

17. A food cutter comprising, in combination, a frame having parallel side walls, a table, said table having parallel depending side walls, means defining coacting pairs of opposed slots in the table side walls and frame side walls, said slots defining a mutually acute angle, a transverse rod extending through said opposed pairs of slots thereby joining the table and frame, crank means for advancing and retracting said transverse rod which coact with the acutely intersecting slots to raise and lower the table with respect to the frame, a corrugated blade, means for removably securing the corrugated blade on the frame in front of the table, elongate guide bars on the frame, one such guide bar aligned with a low point on the corrugated blade, and one such guide bar aligned with a high point on the corrugated blade, means defining a slot in the middle of the table parallel with the two guide bars, a pusher, interlock means extending downwardly from the pusher proportioned for sliding engagement with the table slot means, and means defining guide bar recesses in the bottom of the pusher whereby the pusher may remain engaged for cutting by either guide bar at varying thicknesses of cuts.

References Cited in the file of this patent

UNITED STATES PATENTS

| | | |
|---|---|---|
| 1,771,456 | Alexander | July 29, 1930 |
| 1,866,947 | Reisner | July 12, 1932 |
| 1,899,867 | Heilinger | Feb. 28, 1933 |
| 2,089,258 | Hamad | Aug. 10, 1937 |
| 2,101,595 | Potstada | Dec. 7, 1937 |
| 2,103,537 | Killman et al. | Dec. 28, 1937 |
| 2,286,177 | Fabian | June 9, 1942 |
| 2,682,289 | Brown | June 29, 1954 |